(No Model.)  C. L. JAEGER.  3 Sheets—Sheet 1.
INDUCTION COIL.

No. 524,636.  Patented Aug. 14, 1894.

WITNESSES:

INVENTOR:
Charles L. Jaeger,
BY
A. Faber du Faur,
ATTORNEY (No Model.)  C. L. JAEGER.  3 Sheets—Sheet 2.
INDUCTION COIL.

No. 524,636.  Patented Aug. 14, 1894.

WITNESSES:  INVENTOR:
Charles L. Jaeger,
BY
ATTORNEY

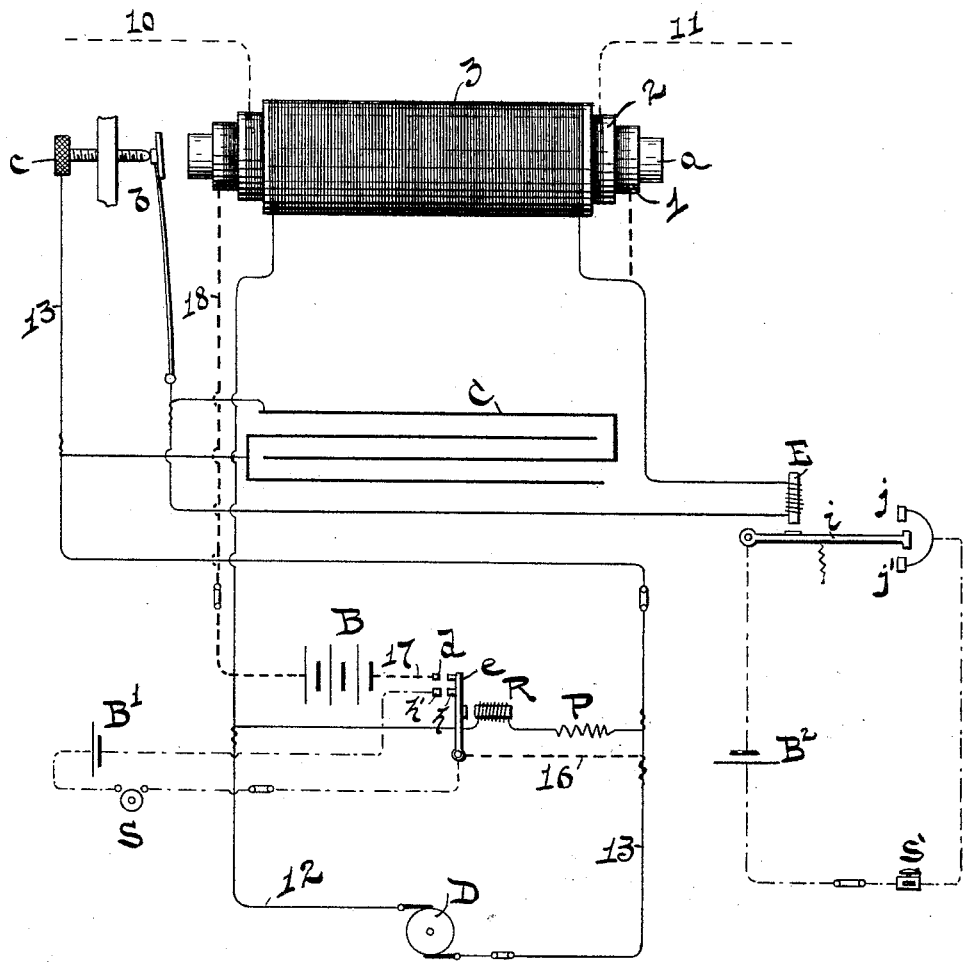

UNITED STATES PATENT OFFICE,

CHARLES L. JAEGER, OF MAYWOOD, NEW JERSEY.

INDUCTION-COIL.

SPECIFICATION forming part of Letters Patent No. 524,636, dated August 14, 1894.

Application filed January 18, 1894. Serial No. 497,231. (No model.)

*To all whom it may concern:*

Be it known that I, CHARLES L. JAEGER, a citizen of the United States of America, and a resident of Maywood, in the county of Bergen and State of New Jersey, have invented certain new and useful Improvements in Induction-Coils, of which the following is a specification.

My invention has reference to improvements in induction coils and has for its objects, first, to provide means whereby the action of the coil continues in case the operation of the primary source of electricity is suspended;—and secondly to cause a signal to be given should the contact breaker of the coil cease to properly perform its function;— so as to adapt the instrument for use where continuous records are to be made by perforating a paper chart or strip, for instance, in electric recording compasses or other instruments of like character.

The nature of my said invention will best be understood when described in connection with the accompanying drawings, in which—

Figure 1:
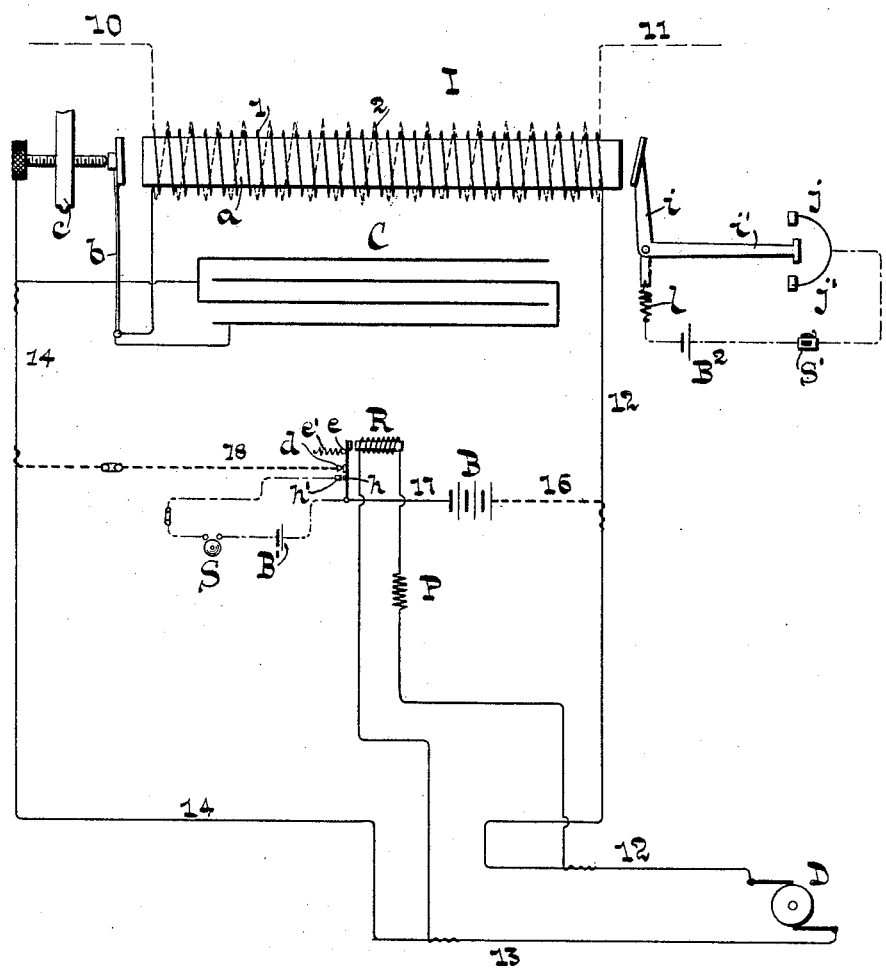
Figure 2:
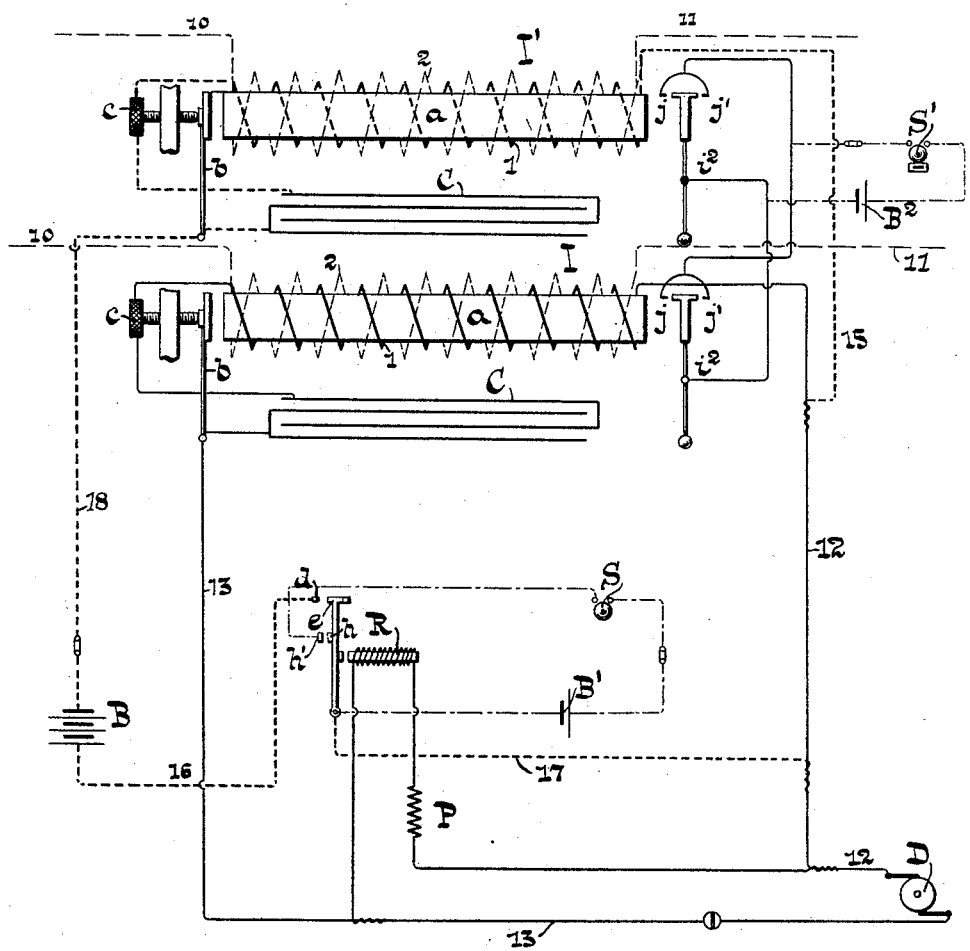

Figure 1 represents diagrammatically an induction coil and electrical apparatus pertaining thereto. Figs. 2 and 3 are similar views illustrating modified arrangements.

Similar letters and numerals of reference indicate corresponding parts throughout the several views of the drawings.

In the drawings, referring at present to Fig. 1, the letter I designates an induction coil, $a$ is its iron core; 1, the usual primary coil; 2, the secondary coil; $b$, $c$, the usual vibrating contact breaker, and 10 and 11 the wires leading from the secondary coil 2, to the recording instrument (not shown).

D is the dynamo, or other source of electricity, connected with the opposite ends of the primary coil 1, by wires 12, 13 and 14; a condenser C of the usual construction being interpolated.

B is a battery, or other auxiliary generator of electricity, having one of its opposite poles connected by wire 16 with one wire of the dynamo circuit, and the other pole by wire 17 with the armature lever $e$ of a relay R, and ultimately through contact $d$ and wire 18 with the second wire of the dynamo circuit. The electro-magnet of the relay R is arranged in a shunt circuit of the dynamo. A spring $e'$ tends to draw the armature lever $e$ against contact $d$, but when the electro-magnet is vitalized, the contact at $d\ e$ is broken. When therefore the dynamo is running and generating electricity, the circuit of the battery B is broken. The currents induced in the secondary coil 2 are transmitted through wires 10 and 11 to the recording instrument. Should however the dynamo from any cause cease to generate electricity, the electro-magnet of relay R is devitalized and the circuit of the battery B is closed at $d\ e$. The current from said battery passes over wire 16, to the dynamo circuit, through the primary coil 1, and from thence to the opposite pole of the battery by wires 14, 18, contact $d$, armature lever $e$ and wire 17,—thereby inducing currents in the secondary coil 2, as before.

The failure of the primary generator may be annunciated in any suitable manner. In the example here shown (Fig. 1) I have provided the armature lever $e$ of relay R with a second contact $h$ arranged opposite a contact $h'$, which contacts are in connection with the wires from a local battery B' having a bell S or other signaling device interpolated in its circuit.

With the ordinary induction coils now in use it sometimes happens that the automatic contact breaker fails to properly perform its functions in view of the vibrating spring armature $b$ remaining in a fixed position against the core $a$, or against the contact $c$, or between the two. In order to automatically give an audible signal of such an occurrence, I provide the following devices:

Opposite to one end of the core $a$ of the induction coil is arranged an armature lever $i$ $i'$, one arm $i'$ of which plays between two contacts $j\ j'$. The tension of a spring $l$ acting upon said lever in line with its point of pivoting, is so adjusted (taking into consideration the magnetic attraction exerted by the core) that ordinarily the armature lever vibrates without coming into connection with either of the contacts $j\ j'$. When the core becomes demagnetized the weight of arm *i'* draws the armature lever over against contact *j'*. The contacts *j j'* and the armature lever are connected to the wires from a local battery B² having a bell S' or other signaling device in its circuit.

Assuming now that the lever *b* of the automatic contact breaker remains against contact *c*, then, in that case, the circuit is continuously closed, and the core becoming strongly magnetic draws the armature lever *i i'* over against contact *j*. The circuit of battery B² being now closed the bell S' rings. In case the armature lever *b* remains against the core of the induction coil, the said core becomes demagnetized and the armature lever *i i'* tilts over against contact *j'*, with the result as above stated.

A suitable annunciator drop may be combined with the bell in the usual manner.

In the example illustrated, I have shown a suitable resistance coil P interpolated in the shunt circuit to the relay R.

It is evident that in place of employing a common induction coil for the generators a separate induction coil may be provided for each generator. Such a construction I have illustrated in Fig. 2. I and I' are the two induction coils connected, the one I, with the dynamo D by wires 12 and 13, and the other I' with the battery B by wires 15, 17, 16 and 18 and relay R. The general arrangement of the relay R for closing the battery circuit, as well as the signaling device S and its connections are the same as before. Each induction coil is provided with a balance relay *i² j j'* constructed and arranged similarly to that illustrated before, to close the circuit of a local battery B² in case of irregularity in the action of either of the automatic contact breakers *b c*. As before, in case the dynamo ceases to produce a current, the battery circuit is closed at *d e* and the induction coil I' is vitalized.

In Fig. 3, I have shown the induction coil I² provided with a third winding 3 encompassing the secondary coil and forming a second primary coil,—so that when either of the primary coils 1—3, is vitalized an induced current is produced in the secondary coil 2, and conducted to the recording instrument. One pole of the dynamo, or other suitable primary generator of electricity is connected by wire 12 to one end of primary coil 3; its other pole being connected by wire 13 to the part *c* of the contact breaker. The battery B is connected to the primary coil 1 by wire 18 and to the circuit of the dynamo by wire 17, relay R, and wire 16. In this figure I have shown also a modified manner of applying the balance relay, the same not being arranged opposite the core *a* of the induction coil, but opposite to an electro-magnet E interpolated in that portion of the circuit common to the battery and dynamo.

It will be seen from the foregoing description that a constant supply of electricity to the recording device is assured and that any irregularity in the action of the induction coil is automatically indicated, so that immediate attention can be given.

What I claim as new, and desire to secure by Letters Patent, is—

1. The combination with an induction coil, having connection with two separate generators of electricity, of a device for automatically switching in the auxiliary generator on the failure of the primary generator, substantially as described.

2. The combination with an induction coil having connection with two separate generators of electricity, of a device for automatically switching in the auxiliary generator on the failure of the primary generator, and a signaling device for indicating said change, substantially as described.

3. The combination with an induction coil having connection with two separate generators of electricity, of a relay actuated upon the failure of the primary generator to close the circuit of the secondary generator, substantially as described.

4. In combination with an induction coil, an armature influenced by the action of said coil, a signaling device, and electrical connections whereby the signaling device is thrown into action by the failure of the automatic contact breaker to properly operate, substantially as described.

5. In combination with the induction coil, of an armature lever influenced by the action of the automatic contact breaker, and arranged to vibrate between two contacts, a signaling device, and electrical connections, substantially as described.

6. The combination with an induction coil having two primary coils and a secondary coil, of a primary generator of electricity and an auxiliary generator connected with the respective primary coils, means for establishing a circuit in the quiescent primary coil when the circuit in the active coil is broken, and a signaling device thrown into action on the transfer from the primary circuit to the auxiliary circuit, substantially as described.

7. The combination with an induction coil having two primary coils and a secondary coil, of a primary generator of electricity connected with one primary coil, and an auxiliary generator connected with the other primary coil, and means for establishing a circuit in the quiescent primary coil when the circuit in the active coil ceases, substantially as and for the purpose set forth.

8. The combination with an induction coil having two primary coils and a secondary coil, of a primary generator of electricity and an auxiliary generator connected with the respective primary coils, and a circuit closer for closing the circuit of the auxiliary generator when the action of the primary generator is interrupted, substantially as described.

9. The combination with two induction coils, of two generators of electricity, and a device for automatically switching in the quiescent generator when the active generator fails, substantially as described.

In testimony that I claim the foregoing as my invention I have signed my name, in presence of two witnesses, this 5th day of January, 1894.

CHARLES L. JAEGER.

Witnesses:
KLAS H. TERNSTEDT,
CHARLES W. THOMAS.